US006276171B1

(12) United States Patent
Brugerolle

(10) Patent No.: US 6,276,171 B1
(45) Date of Patent: Aug. 21, 2001

(54) INTEGRATED APPARATUS FOR GENERATING POWER AND/OR OXYGEN ENRICHED FLUID, PROCESS FOR THE OPERATION THEREOF

(75) Inventor: Jean-Renaud Brugerolle, Paris (FR)

(73) Assignee: L'Air Liquide, Societe Anonyme pour l'Etude et l'Exploitation des Procedes Georges Claude, Paris Cedex (FR)

(*) Notice: Subject to any disclaimer, the term of this patent is extended or adjusted under 35 U.S.C. 154(b) by 0 days.

(21) Appl. No.: 09/481,681

(22) Filed: Jan. 12, 2000

Related U.S. Application Data

(63) Continuation-in-part of application No. 09/285,794, filed on Apr. 5, 1999.

(51) Int. Cl.[7] .................................................. F25J 3/00
(52) U.S. Cl. .................................................. 62/646; 62/648
(58) Field of Search ............................ 62/643, 646, 647, 62/648

(56) References Cited

U.S. PATENT DOCUMENTS

| | | | |
|---|---|---|---|
| 3,394,555 | * | 7/1968 | LaFleur .................................. 62/643 |
| 4,224,045 | * | 9/1980 | Olszewski et al. ..................... 62/646 |
| 5,251,450 | * | 10/1993 | Agrawal et al. ........................ 62/646 |
| 5,251,451 | * | 10/1993 | Xu et al. ................................ 62/646 |
| 5,638,699 | * | 6/1997 | Yamamoto et al. .................... 62/643 |
| 6,050,106 | * | 4/2000 | Yamamoto et al. .................... 62/643 |

* cited by examiner

Primary Examiner—William Doerrler
(74) Attorney, Agent, or Firm—Young & Thompson

(57) ABSTRACT

In an integrated power generation system, part of the air from a gas turbine compressor is separated in a single nitrogen wash column to remove oxygen and the gaseous nitrogen produced at the top of the column is sent back to a point upstream of the expander of the gas turbine. The wash column may be fed with liquid nitrogen from an independent air separation unit in which air is separated. Liquid from the bottom of the wash column may be fed back to the air separation unit. In order to boost production of an air separation plant, an additional plant is linked with the original plant. For example, air may be separated in a single nitrogen wash column to remove oxygen and gaseous nitrogen is produced at the top of the column. The wash column is fed with liquid nitrogen from the high pressure column of the air separation unit. Liquid from the bottom of the wash column may be fed back to the air separation unit.

47 Claims, 8 Drawing Sheets

INTEGRATED APPARATUS FOR GENERATING POWER AND/OR OXYGEN ENRICHED FLUID, PROCESS FOR THE OPERATION THEREOF

This is a continuation-in-part application of co-pending U.S. application Ser. No. 09/285,794 filed on Apr. 5, 1999.

TECHNICAL FIELD OF THE INVENTION

The present invention relates to an integrated apparatus for generating power and/or oxygen-enriched fluid and a process for the operation thereof.

It also relates to an air separation apparatus and process.

BACKGROUND OF THE INVENTION

All present oxygen production facilities extract oxygen from air. Air has the advantage of being free and available everywhere. One of the drawbacks is that because air is at atmospheric pressure, it contains a lot of water and CO2 at low partial pressure. And pressure drops in process cycles are energy expensive close to atmospheric pressure. It is the reason why most oil, chemical or petrochemical processes operate in the range of 10–40 bar. The pressure drops are less costly, heat exchange is easier, and the size of plants is reduced, drastically decreasing overall cost.

In the case of oxygen production, as air contains 80% nitrogen, a low pressure waste gas containing the nitrogen is normally produced. In case of cryogenic distillation, the cold heat contained in the waste nitrogen has to be recuperated through heat exchangers which are costly both in investment and related energy needs.

Some oxygen plants operate at higher than normal pressure with some means and additional investment to recover the energy lost in the waste nitrogen. FIG. 1 shows a basic power gas turbine arrangement in which an air compressor 1 sends air 3 at between 8 and 35 bar to a combustor 5 fed by fuel 6. The combustion gas 7 mixed with dilution air 4 forms mixture stream 8 which is expanded in gas turbine 9 having an inlet temperature between 900 and 1400° C. and generates power. To achieve good combustion in the burner, a close to stoichiometric mixing is necessary to use fuel efficiently and produce minimum pollution. But in this case, combustion produces a hot gas at temperatures higher than 2000° C., well above what any kind of hot turbine can accept. For this reason, quench type cooling takes place by mixing this very hot flue gas 7 with compressed dilution air 4 from the compressor at the same pressure as stream 3 but much lower temperature. The dilution air flow 4 is of the same order of magnitude as the combustion air flow 3.

Because this dilution air 4 does not participate in the combustion, oxygen is not necessary. So it is possible to extract the oxygen contained in the dilution air 4 as shown in FIG. 2. The air 4 is cooled, purified and distilled in separation unit 12 producing oxygen 10 and nitrogen 11. The nitrogen 11 is mixed with combustion gas 7.

Generally the separation unit used in a double column comprising a thermally linked high pressure column and low pressure column. However it is known to use a single column with a top condenser and a bottom reboiler for this purpose.

If the amount of nitrogen 11 is limited, it may alternatively be mixed with air stream 3 and sent to combustor 5 as described in U.S. Pat. No. 4,224,045. Another option is to send the nitrogen to be mixed with the fuel stream 6.

SUMMARY OF THE INVENTION

According to the present invention, there is provided an integrated apparatus for generating power and/or oxygen enriched fluid comprising a first air separation unit, a gas turbine comprising a combustor and an expander, a first compressor, means for sending air from the first compressor to the combustor and to the air separation unit, means for sending combustion gases from the combustor to the expander, means for sending nitrogen from the air separation unit to a point upstream of the expander and means for either compressing the nitrogen sent to a point upstream of expander, further compressing the air sent to the first air separation unit from the first compressor or expanding the air sent to the combustor from the first compressor characterized in that the first air separation unit comprises at least a single column fed by air and the apparatus comprises means for sending liquid nitrogen from an external source to the top of the single column, said external source not being a condenser fed by gaseous nitrogen from the top of the single column, and means for removing gaseous nitrogen from the top of the single column and for removing an oxygen-enriched fluid from the bottom of the column.

According to further optional aspects of the invention:
- the single column has not bottom reboiler and no top condenser.
- the apparatus comprises a second compressor and means for sending air from the further compressor to the single column.
- the external source of liquid nitrogen is a second air separation unit comprising at least one distillation column
- the second air separation unit comprises a high pressure column and a low pressure column which are thermally linked.
- there are means for withdrawing the liquid nitrogen from the high pressure column or the low pressure column, where necessary pressurizing it and sending it to the top of the single column in liquid form and/or means for sending the oxygen-enriched liquid from the bottom of the single column to the high pressure column and/or the low pressure column.
- there are means for sending air to the double column from one of the first, second or a third compressor.

Alternatively there may be means for sending gaseous nitrogen from the single column to the double column and/or means for sending nitrogen from the double column to a point upstream of the expander.

The apparatus may additionally include a gasifier, means for sending oxygen from the air separation unit and a carbon containing substance to the gasifier and means for sending fuel from the gasifier to the combustor.

According to a still further aspect of the invention, there is provided a process for generating power and/or oxygen enriched fluid using an integrated power generation system comprising compressing air in a first compressor, sending air from the first compressor to a combustor and to a first air separation unit, sending nitrogen from the air separation unit to a point upstream of an expander, sending fuel to the combustor, sending combustion gas from the combustor to the expander and either compressing the nitrogen sent to a point upstream of expander, further compressing the air sent to the first air separation unit from the first compressor or expanding the air sent to the combustor from the first compressor characterized in that the first air separation unit comprises at least one column and the process comprises feeding a column of the first air separation unit column with air, sending liquid nitrogen from an external source to the top of the single column, the external source not being a condenser fed by gaseous nitrogen from the top of the s column and removing gaseous nitrogen from the top of the single column and an oxygen enriched fluid from the bottom of the column.

Further features of the process may include:

said column having no bottom reboiler and no top condenser.

sending air from a second compressor to the single column.

the external source being a second air separation unit comprising at least one column—the external source comprises a high pressure column and a low pressure column which are thermally linked withdrawing the liquid nitrogen from the high pressure column, pressurizing and sending it to the top of the column of the first air separation unit.

sending the liquid from the bottom of the single column to the second air separation unit, optionally to the high pressure column or low pressure column of the second air separation unit.

sending air to the second air separation unit from one of the first, second or a third compressor.

sending gaseous nitrogen from the column of the first air separation unit to the second air separation unit.

means for sending nitrogen from the second air separation unit to a point upstream of the expander.

wherein the column of the first air separation unit operates at between 8 and 35 bar.

the highest pressure of the second air separation unit is between 5 and 25 bar.

the amount of air sent from the first compressor to the first air separation unit and the amount of nitrogen sent upstream of the expander differ by no more than 10%, preferably 5%.

all the nitrogen originates from the first air separation unit.

the nitrogen originates from the first air separation unit and the external source.

the external source is the second air separation unit.

According to a further aspect of the invention there is provided an air separation apparatus comprising a first compressor, means for sending air from the first compressor to the air separation unit following cooling and purification, an air separation unit, means for removing a nitrogen enriched fluid and an oxygen enriched fluid from the air separation unit characterized in that the apparatus comprises a further column, means for sending nitrogen-enriched liquid from the air separation unit to the top of the further column, means for sending compressed air to the bottom of the further column and means for removing gaseous nitrogen from the top of the further column and for removing oxygen-enriched fluid from the bottom of the further column and sending it to the air separation apparatus.

According to further optional aspects of the invention,:

said further column has no bottom reboiler and/or no top condenser.

the apparatus comprises a second compressor and means for sending air from the second compressor to the further column.

the apparatus comprises means for pressurizing the nitrogen-enriched liquid from the high pressure column, and sending it to the top of the column of the first air separation unit.

the air separation unit is a double column comprising a high pressure column and a low pressure column and the nitrogen enriched liquid comes from the high pressure column.

there are means for sending the liquid from the bottom of the further column to the bottom of the high pressure column.

the air separation unit is a triple column comprising a high pressure column, an intermediate pressure column and a low pressure column and the nitrogen enriched liquid comes from the high pressure column or the intermediate pressure column.

there are means for sending the liquid from the bottom of the further column to the bottom of the high pressure column or the middle of the intermediate pressure column.

According to a further aspect of the invention, there is provided an air separation process comprising compressing air in a first compressor, sending air from the first compressor to a first air separation unit, removing a nitrogen enriched fluid and an oxygen enriched fluid from the first air separation unit and feeding the bottom of a further column with air, characterized in that the process comprises sending nitrogen-enriched liquid from the first air separation unit to the top of the further column, and removing nitrogen enriched gas from the top of the further column and an oxygen enriched liquid from the bottom of the further column and sending the oxygen enriched liquid to the air separation unit.

According to further optional aspects of the invention:

said further column is a single column having no bottom reboiler and no top condenser.

the process comprises sending air from a second compressor to the further column.

the process comprises pressurizing the nitrogen enriched liquid from the air separation unit, and sending it to the top of the column of the further column.

the further column operates at between 8 and 25 bar.

the pressure of the higher or highest pressure column of the air separation unit is between 5 and 25 bar.

the oxygen enriched liquid at the bottom of the further column contains between 30% and 40% oxygen.

the air separation unit is a double column comprising a high pressure column and a low pressure column and the nitrogen enriched liquid comes from the high pressure column.

the process comprises sending the liquid from the bottom of the further column to the bottom of the high pressure column.

the process comprises removing a stream containing at least 80% oxygen from the low pressure column.

the air separation unit is a triple column comprising a high pressure column, an intermediate pressure column and a low pressure column and the nitrogen enriched liquid comes from the high pressure column or the intermediate pressure column.

the process comprises sending the liquid from the bottom of the further column to the bottom of the high pressure column or the middle of the intermediate pressure column.

the process comprises removing a stream containing at least 80% oxygen from the low pressure column.

In particular the process may be an integrated gasification combined cycle process in which oxygen from the air separation unit is sent to gasify a carbon containing substance thereby producing fuel for the combustor.

BRIEF DESCRIPTION OF THE DRAWING

The invention will now be described in further detail with reference to the FIGS. 3 to 6 which are schematic flow sheets of an integrated air separation unit for use in an integrated power generation system and with reference to FIGS. 7 and 8 which are schematic flow sheets of air separation units according to the invention.

DETAILED DESCRIPTION OF THE INVENTION

Cryogenic technology is the basic technology for large air separation plants.

Figure 1:
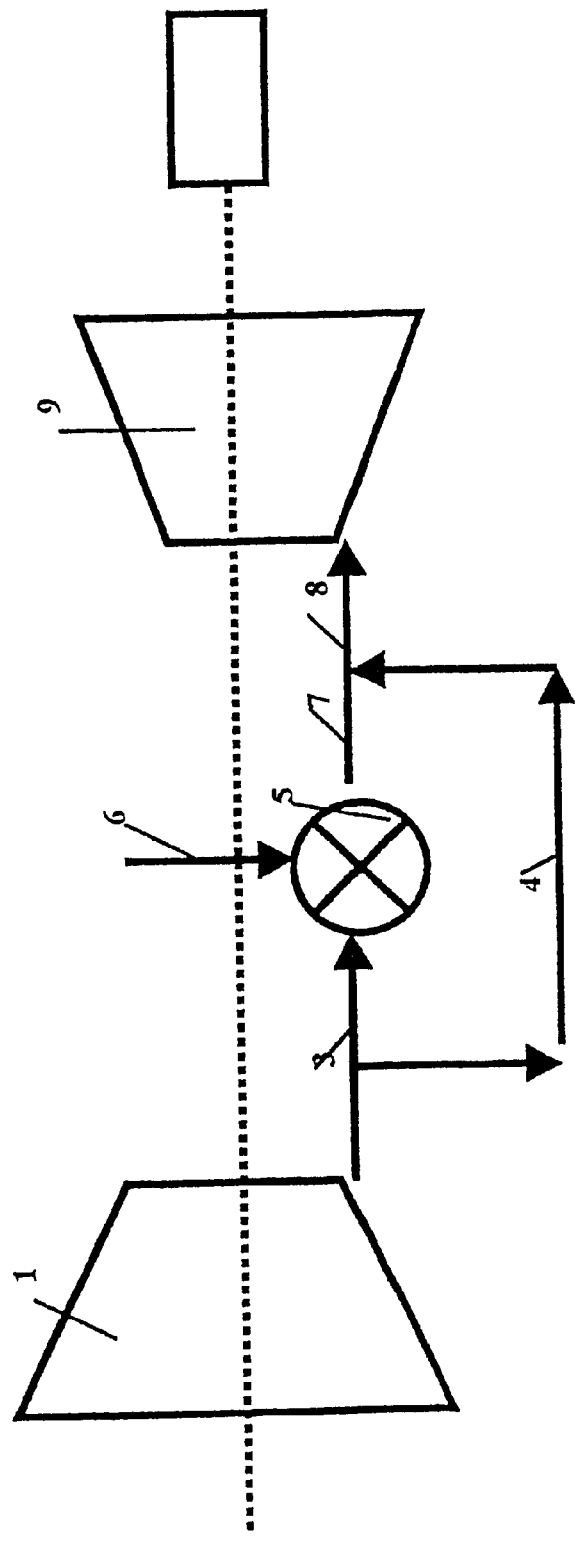
Figure 2:
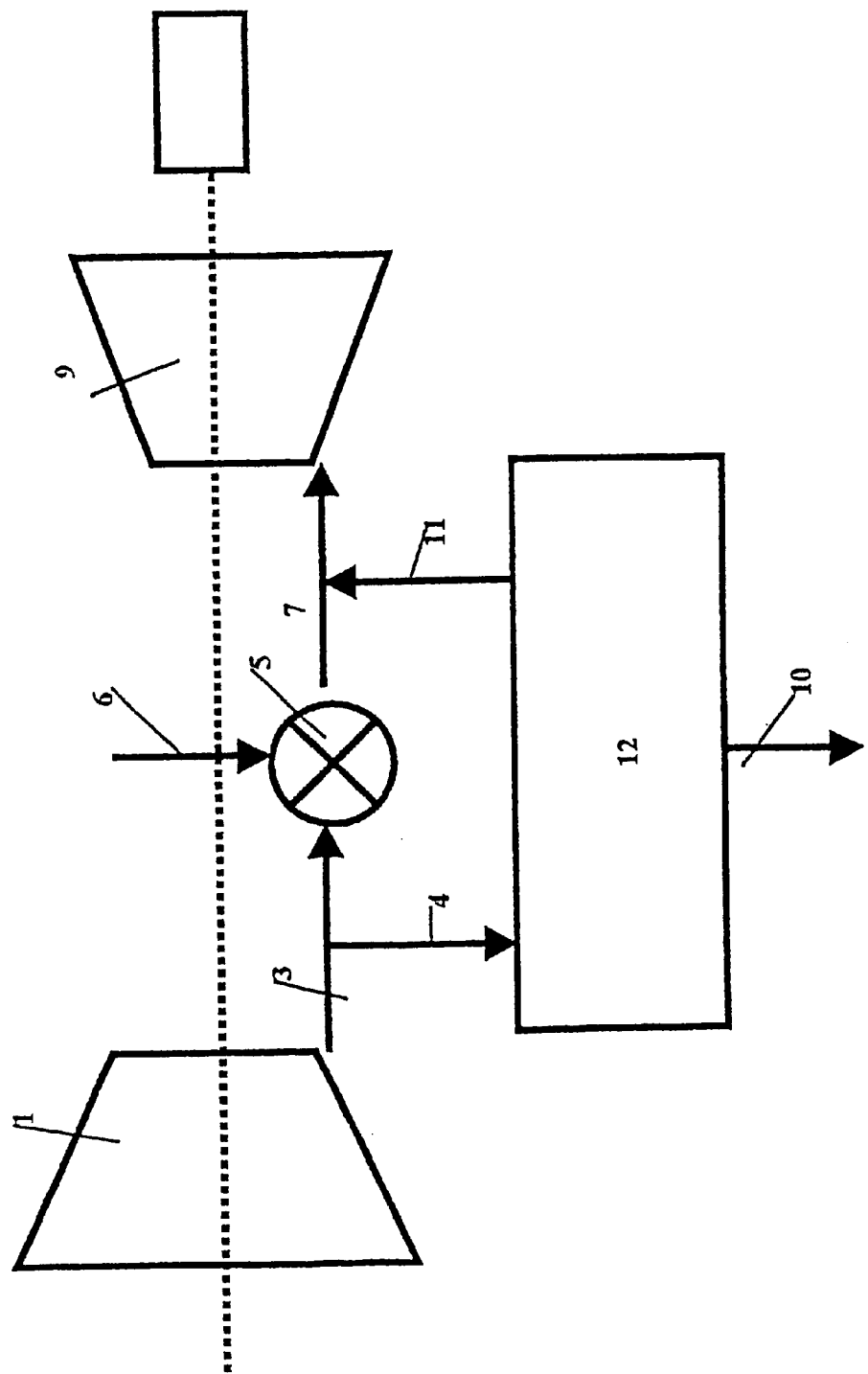
Figure 3:
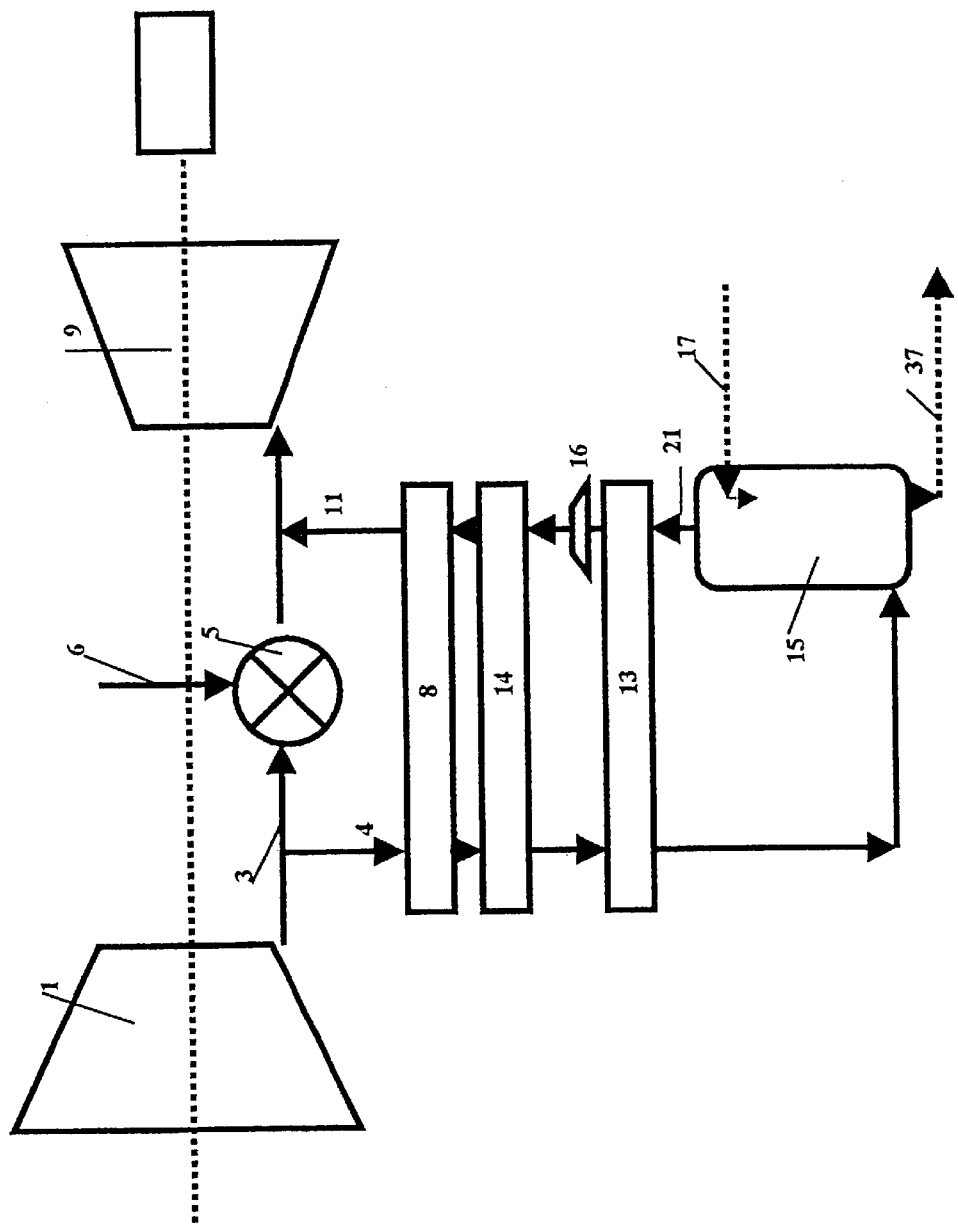
Figure 4:
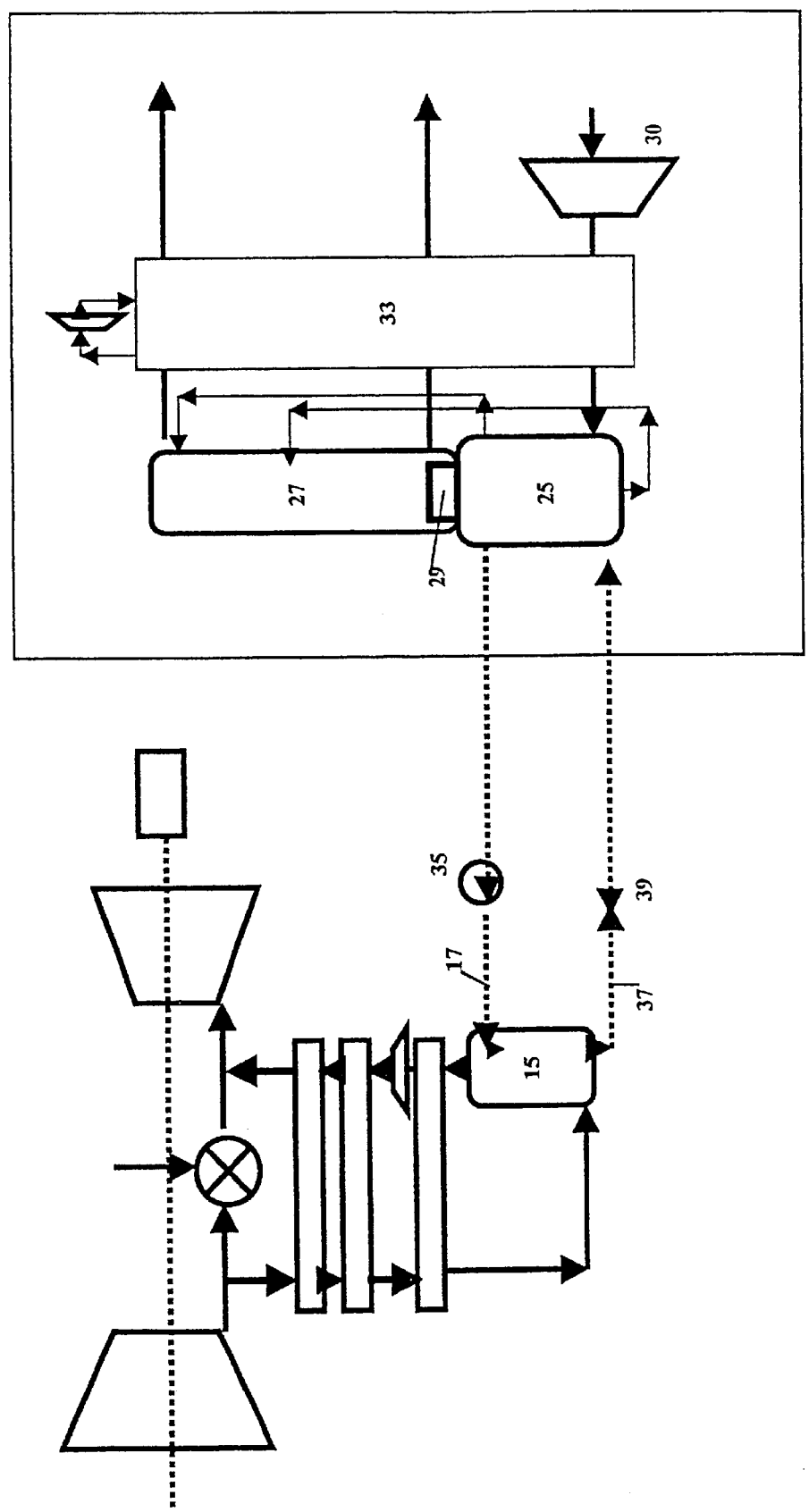
Figure 5:
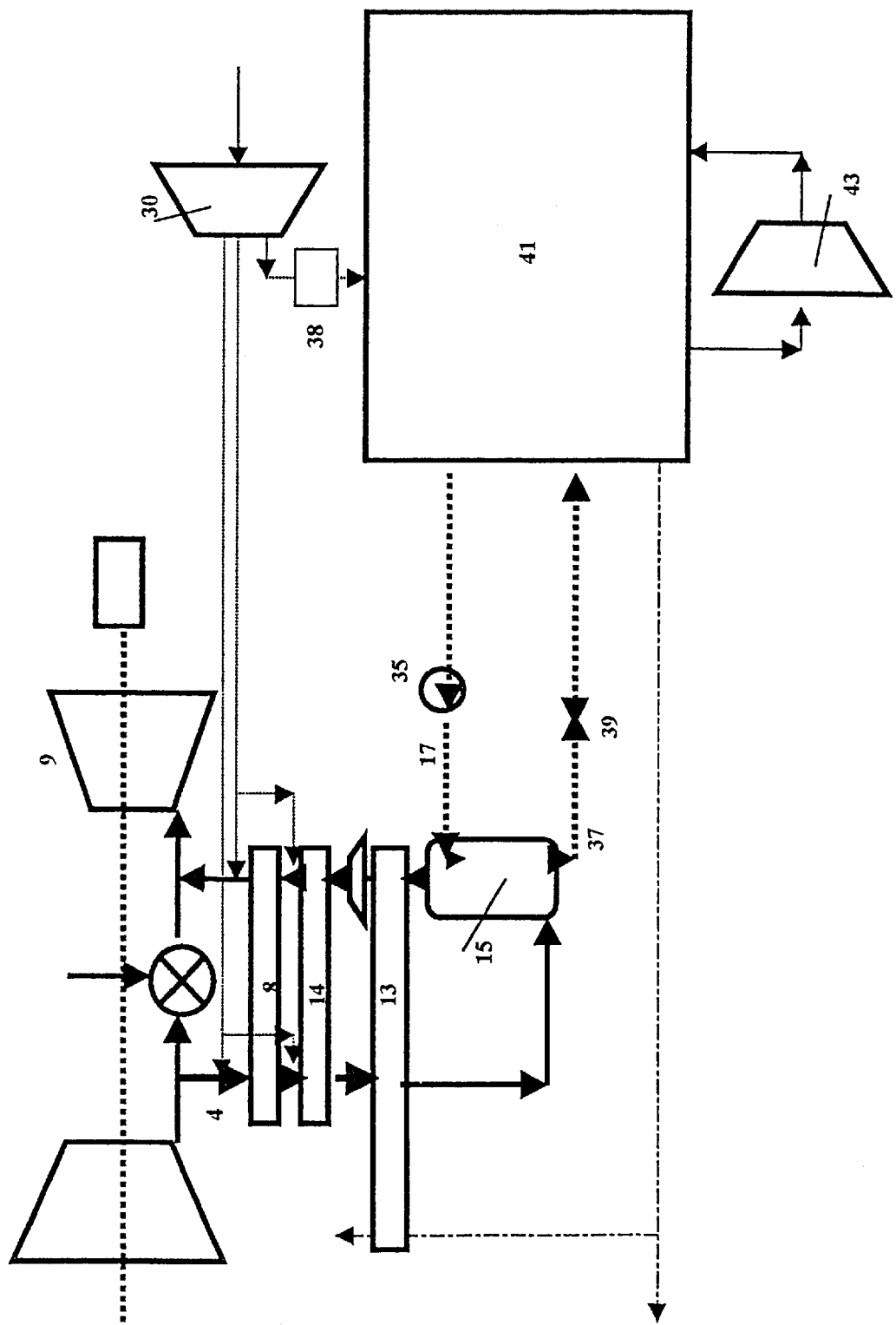
Figure 6:
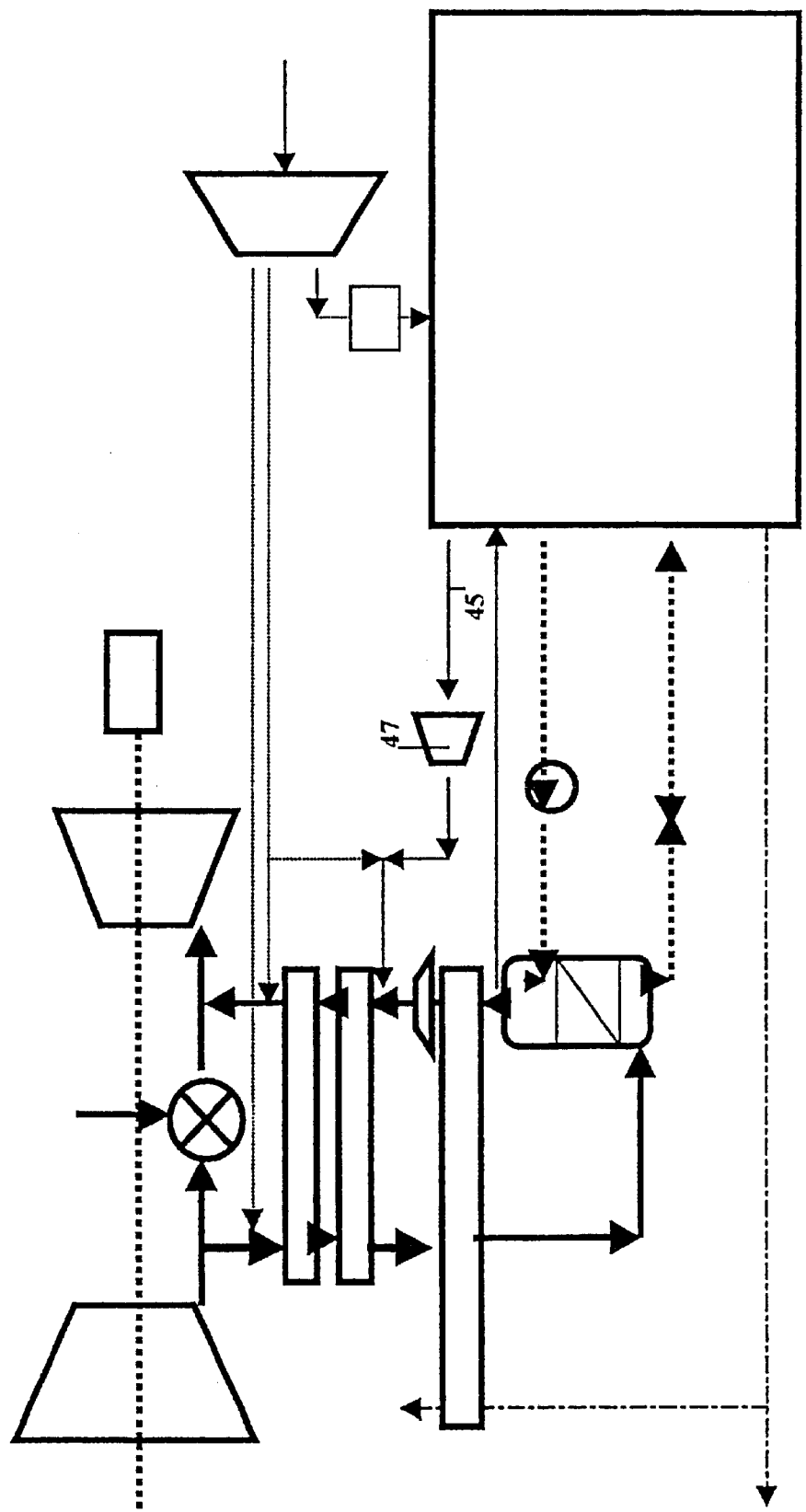

In the process of FIG. 3, air is compressed to between 8 and 35 bar in compressor 1. Air stream 3 is sent to combustor 5 where it is burnt with fuel 6. Air stream 4 is cooled in heat exchanger 8, purified in purifying unit 14 and then cooled in heat exchanger 13 to a temperature suitable for cryogenic distillation. It is then sent to a first air separation unit, in this case a wash column 15 which is a single column fed at the top by a liquid nitrogen wash stream 17 which may be pure or contain up to 5% oxygen. Various sources for the liquid are shown in FIGS. 4 to 6.

Liquid containing between 27 to 40% oxygen is removed from the bottom of column 15.

Gaseous nitrogen 21 is removed from the column at a pressure between 8 and 25 bar, warmed in exchangers 13,8, reactivates air purification 14, compressed and mixed either with the combustion gas as shown or with air stream 3. The mixture thus formed is sent to expander 9 producing external work. The nitrogen is compressed in a booster 16 at ambient temperature but may be compressed at sub-ambient or super-ambient temperatures so as to make up for the pressure drop in the exchangers and column.

Alternatively air stream 4 may be boosted at any of the temperatures described.

A less economical option would be to expand the feed air 3 slightly before sending it to the combustor.

When the air separation from our gas turbine by-pass is done using a liquid nitrogen wash column 15 (FIG. 3), we get the following advantages:
- all heat exchange (hot and cold) and purification are carried out at elevated pressure thus reducing investment and energy drop cost.
- the nitrogen wash column 15 is fed by liquid nitrogen, and very impure oxygen is removed in liquid rich phase. These liquids easily can be pumped and expanded, thus rendering this wash totally independent of the rest of the oxygen process.
- gaseous nitrogen flow at the outlet of the wash column 15 is almost equal to the air flow at the inlet of this column, thus maintaining the perfect balance of the gas turbine.

In the version of FIG. 4, the liquid nitrogen for the wash column 15 is derived from a second air separation unit comprising a double column with a high pressure column 25 and a low pressure column 27 thermally linked via a reboiler condenser 29 as in standard plants. The system may additionally include an argon separation column fed by the low pressure column. The operating pressures preferably vary between 5 and 25 bar for the high pressure column.

The air for the double column comes from a compressor 30 and is sent to the high pressure column 25 after cooling in exchanger 33. Oxygen enriched and nitrogen enriched liquids are sent from the high pressure column to the low pressure column as reflux. The system may use a Claude turbine, a turbine feeding air to the low pressure column or a nitrogen turbine to produce refrigeration.

Gaseous oxygen is produced from the low pressure column either directly or by vaporizing liquid oxygen. Waste nitrogen is withdrawn from the low pressure column. Liquid nitrogen 17 from the top of the high pressure column 25 is sent to the top of wash column 15 following pumping in pump 35. Liquid 37 from the bottom of column 15 is expanded in a valve 39 and sent to the bottom of the high pressure column or to the low pressure column.

A standard cryogenic oxygen plant has a medium pressure column with liquid nitrogen at the top and oxygen rich liquid at the bottom. If one installs a gas turbine next to an oxygen plant to produce electric power (for the oxygen plant or not) or to produce a combination of power and steam (cogeneration), the existing plant can operate in conjunction with an additional plant so as to supply a new product to the gas turbine.

With the arrangement of FIG. 4, some liquid nitrogen or poor liquid 17 can be withdrawn from the existing medium pressure column or any other point of the process such as the low pressure column. It can be pumped to the relevant pressure in order to feed the additional plant which is a nitrogen wash column. The corresponding rich liquid 37 will be returned to the low pressure column as the normal rich liquid. Thus some extra oxygen molecules will be fed to the column, allowing increased oxygen production (at the same or reduced purity, depending on the boosting ratio).

Obviously, this interesting process can be used in a grass root plant. In this case, a dedicated cold box will be better suited than a standard plant. Because oxygen is to be replaced by nitrogen or air for the gas turbine, some additional compressed air is needed. It can be injected (FIG. 5) either:
- in the cold box 41 via compressor 30. The necessary pressure will be lower but a second air purification 38 is necessary.
- injected at the inlet of the turbine 9 (before or after the hot exchanger 8). No purification is necessary but the corresponding oxygen will be lost (which is not a problem if the by-pass flow is sufficient for oxygen demand.
- mixed with the by-pass air 4 before nitrogen wash (before or after the hot exchanger 8). In that case the existing purification 14 can be used to purify the air.

In certain cases and depending on the final oxygen pressure required, a nitrogen (or air) recycle compressor 43 is necessary to adjust the separation power requirement of the oxygen separation and compression cycle. To maintain the advantages of the global pressurized cycle, this compressor will preferably receive air or nitrogen at medium pressure (above 3 bar).

Refrigeration from oxygen will be recovered in the cold box 41 or within the cold exchanger 13.

Because the gas at the top of nitrogen wash column is nitrogen, it can be used partly 45 to help the final distillation instead of the recycle compressor. The flow to the turbine can be readjusted as before with air or waste nitrogen recompression 47. It might have an advantage over a nitrogen recycle compressor as this compressed nitrogen will not need any final cooling (FIG. 6).

It will be appreciated that the external source for the liquid nitrogen could be a remote storage tank periodically replenished by tanker trucks or a liquefier in which gaseous nitrogen e.g. from a pipeline is condensed rather than an air separation unit. The oxygen enriched liquid from the first air separation unit may then be sent to another column or another user, or to liquefy after expansion the gaseous nitrogen from the pipe-line In the case where the external source is a second air separation unit, this may be a single column air separator generating liquid nitrogen, a standard double column with or without minaret, an external condenser of an air separation column, a double column in which oxygen enriched liquid from the bottom of the low pressure column is fed to a top condenser of the low pressure column, a triple column in which rich liquid from a high pressure column feeds a medium pressure column and liquid from the medium pressure column feeds the low pressure column for example of the type shown in FR1061414 or EP538118.

The second air separation unit serving as an external source may produce other liquids in addition to the nitrogen and other gaseous products. Gases may be produced at high pressure by pumping and vaporizing liquids withdrawn from columns of the second air separation unit.

One advantage of the present system is that the first air separation unit and the second air separation unit can operate independently by providing storage tanks for the liquid nitrogen from the second air separation unit and the oxygen enriched liquid from the first air separation unit.

Thus when the second air separation unit is not operational, the first air separation unit draws liquid nitrogen from the storage. Similarly when the first air separation unit is not operational the oxygen enriched liquid is removed from the storage and sent to the second air separation unit.

Figure 7:
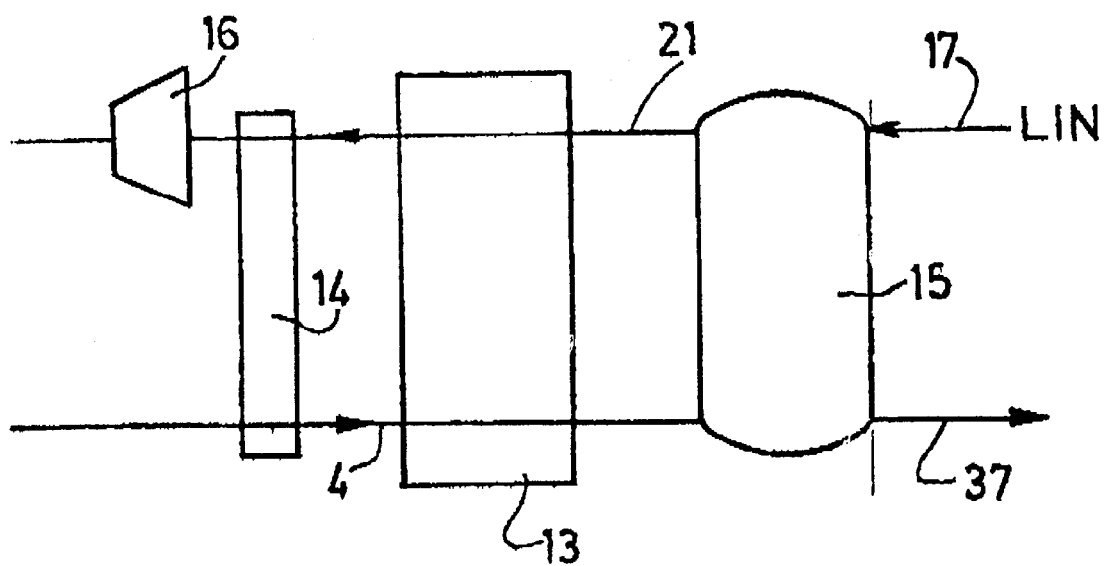

In the process of FIG. 7, air stream 4 is purified in purifying unit 14 and then cooled in heat exchanger 13 to a temperature suitable for cryogenic distillation. It is then sent to a first air separation unit, in this case a wash column 15 which is a single column fed at the top by a liquid nitrogen wash stream 17 which may be pure or contain up to 5% oxygen.

Liquid 37 containing between 27 to 40% oxygen is removed from the bottom of column 15.

Gaseous nitrogen 21 is removed from the column at a pressure between 8 and 25 bar, warmed in exchangers 13,8, reactivates air purification 14 and is compressed in a booster 16 at ambient temperature but may be compressed at sub-ambient or super-ambient temperatures so a to make up for the pressure drop in the exchangers and column.

Figure 8:
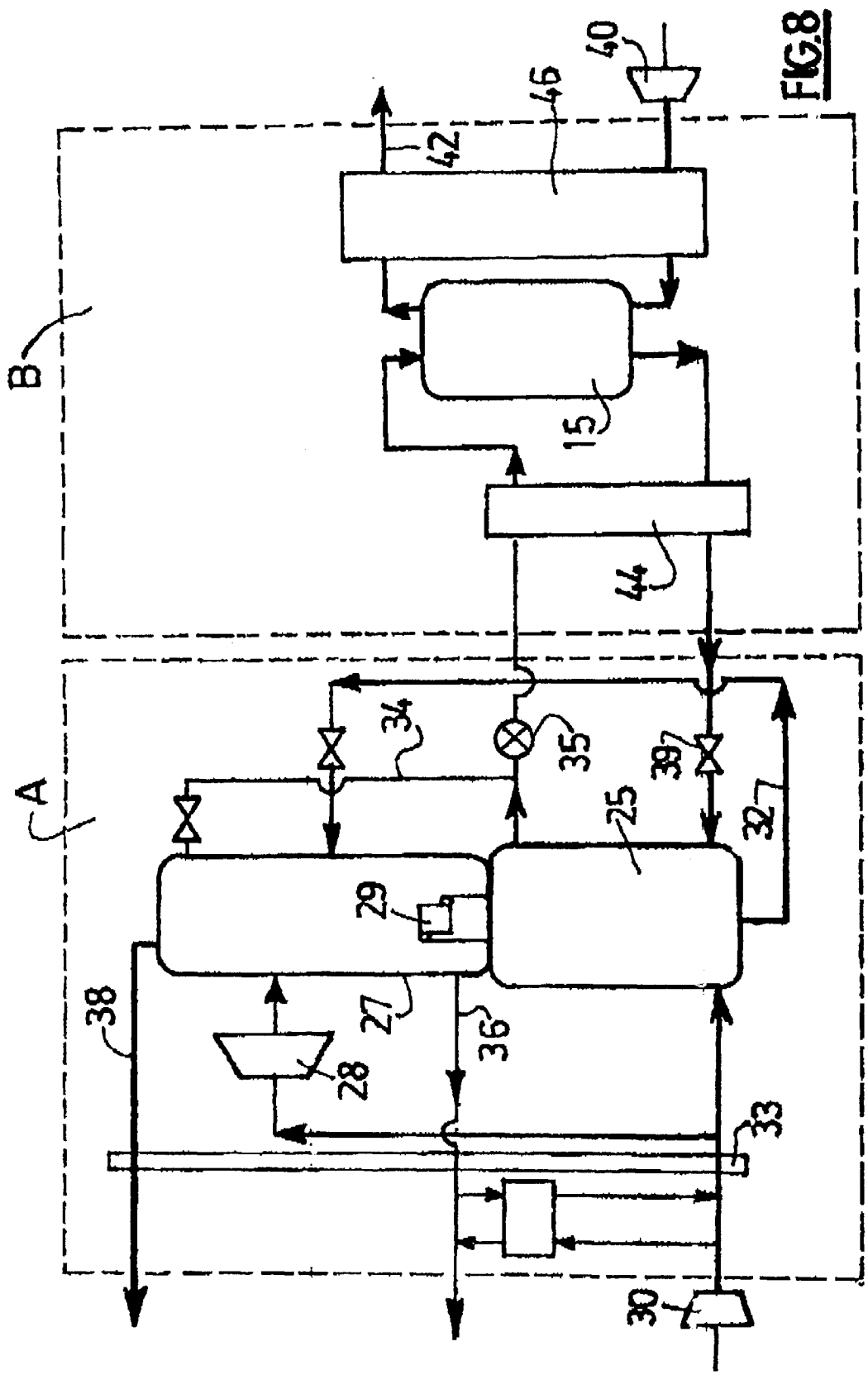

An air separation unit which may be a source of the liquid is shown in FIG. 8. It will of course be appreciated that this air separation process and that of FIG. 7 are not integrated with a gas turbine in these particular cases.

An existing plant fed by 1000 Nm3/h of air consists of a double column where all the refrigeration is supplied by a high pressure nitrogen turbine fed by 210 Nm3/h nitrogen which provides the refrigeration for liquid production and an air turbine sending 80 Nm3/h air to the low pressure column which provides refrigeration for the apparatus. The amount of oxygen initially produced is 210 Nm3/h and this can be increased by adding a wash column as described above to produce a plant as shown in FIG. 8, no longer using the nitrogen turbine and increasing the amount of air flowing in the other turbine by 20% to cover thermal losses.

In the version of FIG. 8, the liquid nitrogen for the further wash column 15 is derived from an air separation unit comprising a double column with a high pressure column 25 and a low pressure column 27 thermally linked via a reboiler condenser 29 as in standard plants. The system may additionally include an argon separation column fed by the low pressure column. The operating pressures preferably vary between 5 and 25 bar for the high pressure column.

The 1000 Nm3/h of air for the double column come from a compressor 30 and are sent partly to the high pressure column 25 after cooling in exchanger 33 and partly (100 Nm3/h) to the turbine 28 which feeds the low pressure column 27. Oxygen enriched and nitrogen enriched liquids 32,34 are sent from the high pressure column to the low pressure column as reflux. The system may additionally use a Claude turbine or a nitrogen turbine to produce refrigeration.

210 Nm3/h of gaseous impure oxygen 36 is produced from the low pressure column either directly or by vaporizing liquid oxygen. 735 m3/h of waste nitrogen 38 is withdrawn from the low pressure column.

180 Nm3/h of liquid nitrogen 17 from between 0 and 10 theoretical trays below the top of the high pressure column 25 is sent to the top of wash column 15 following pumping in pump 35. 180 Nm3/h of liquid 37 containing 55 Nm3/h oxygen from the bottom of column 15 is expanded in a valve 39 and sent to the bottom of the high pressure column or alternatively to the low pressure column. This liquid typically contains between 30 and 40 mol. % oxygen. 300 Nm3/h of air is sent to the bottom of the further column 15 from a separate compressor, another source of compressed air or the main compressor 30 and 300 Nm/3/h of gaseous nitrogen 42 is removed from the top. This nitrogen may be used as a product stream.

With the arrangement of FIG. 8, some liquid nitrogen or poor liquid 17 can be withdrawn from the top of the medium pressure column or a few theoretical trays below the top of that column or any other point of the process such as the low pressure column. It can be pumped or expanded to the relevant pressure in order to feed the nitrogen wash column. The corresponding rich liquid 37 will be returned to the low pressure column as the normal rich liquid. Thus some extra oxygen molecules will be fed to the column, allowing increased oxygen production (at the same or reduced purity, depending on the boosting ratio).

In this way, the nitrogen molecules sent from the double column to the wash column are replaced by oxygen molecules. This means that the amount of impure oxygen which can be produced by the double column is increased by up to 25%.

The pressure drop for nitrogen waste gas from the low pressure column reduces because less nitrogen enters the double column when the wash column is used. The pressure drop for the oxygen is substantially increased and it may be necessary to use additional heat exchangers for the heat exchange between the air and the oxygen.

In certain cases and depending on the final oxygen pressure required, a nitrogen (or air) recycle compressor 43 is necessary to adjust the separation power requirement of the oxygen separation and compression cycle. To maintain the advantages of the global pressurized cycle, this compressor will preferably receive air or nitrogen at medium pressure (above 3 bar).

Refrigeration from oxygen will be recovered in the cold box A or within the cold exchanger 13.

The further column may be contained in a second cold box B together with the exchanger 44 in which the feed liquid nitrogen is heated following pressurization against the bottom liquid of the further column and the exchanger 46 in which the feed air for the further column is cooled against the product gaseous nitrogen from the further column.

Because the gas at the top of nitrogen wash column is nitrogen, it can be used partly to help the final distillation instead of the recycle compressor.

The air may be cooled using the gaseous nitrogen from the top of the further column.

The air separation unit may be a single column air separator generating liquid nitrogen, a standard double column with or without minaret, an external condenser of an air separation column, a double column in which oxygen enriched liquid from the bottom of the low pressure column is fed to a top condenser of the low pressure column or a triple column in which rich liquid from a high pressure column feeds a medium pressure column and liquid from the medium pressure column feeds the low pressure column for example of the type shown in FR1061414 or EP538118.

The air separation unit may produce other liquids in addition to the nitrogen and other gaseous products. Gases may be produced at high pressure by pumping and vaporizing liquids withdrawn from columns of the second air separation unit.

In particular it may include an argon column or a mixing column.

One advantage of the present system is that the air separation unit and the further column can operate independently by providing storage tanks for the liquid nitrogen from the air separation unit and the oxygen enriched liquid from the further column unit.

Thus when the air separation unit is not operational, the further column draws liquid nitrogen from the storage. Similarly when the further column is not operational the oxygen enriched liquid is removed from the storage and sent to the air separation unit.

With an apparatus of this sort, it becomes possible to increase the capacity of the existing air separation unit (i.e. the double or triple column) by 25% for impure oxygen by adding a further air separation column.

The combined air separation unit and further column will produce a greater proportion of oxygen and consequently a lesser proportion of waste nitrogen than the air separation unit alone. For this reason, more oxygen can be produced with less waste nitrogen. In general, the waste nitrogen circuits are the bottleneck for increased oxygen production by simple feed air flow boosting.

There are new separation power requirements for purifying the additional oxygen introduced in the air separation unit. This extra power can be obtained, either by decreasing the purity of part or all of the oxygen produced; or by reducing the total amount of gas expanded in one or more turbines to produce less refrigeration (thus possibly reducing liquid production), taking into account that the further column will require additional cooling.

I claim:

1. An integrated apparatus for generating oxygen enriched fluid and/or power comprising a first air separation unit, a gas turbine comprising a combustor and an expander, a first compressor, means for sending air from the first compressor to the combustor and to the first air separation unit, means for sending combustor gases from the combustor to the expander, means for sending nitrogen from the first air separation unit to a point upstream of the expander and means for either compressing the nitrogen sent to a point upstream of the expander, further compressing the air sent to the first air separation unit from the first compressor or expanding the air sent to the combustor from the first compressor wherein the first air separation unit is one single column and the apparatus comprises means for sending liquid nitrogen from an external source to the top of the single column, the external source not being a condenser fed by gaseous nitrogen from the single column and means for removing gaseous nitrogen from the top of the single column and for removing oxygen-enriched fluid from the bottom of the column.

2. An apparatus as claimed in claim 1 wherein said single column has no bottom reboiler and/or no top condenser.

3. An apparatus as claimed in claim 1 comprising a second compressor and means for sending air from the single further compressor to the column.

4. An apparatus as claimed in claim 3 wherein the liquid nitrogen external source is a second air separation unit comprising at least one column.

5. An apparatus as claimed in claim 4 wherein the second air separation unit comprises a high pressure column and a low pressure column thermally linked with one another and the liquid nitrogen is derived from one of the columns.

6. An apparatus as claimed in claim 5 comprising means for withdrawing the liquid nitrogen from the high pressure column, pressurizing and sending it to the top of the column of the first air separation unit.

7. An apparatus as claimed in claim 6 comprising means for sending the liquid from the bottom of the single column of the first air separation unit to the second air separation unit.

8. An apparatus as claimed in claim 5 comprising sending air to the second air separation unit from one of the first, second or a third compressor.

9. An apparatus as claimed in claim 5 comprising means for sending gaseous nitrogen from the single column of the first air separation unit to the second air separation unit.

10. An apparatus as claimed in claim 5 comprising means for sending nitrogen from the second air separation unit to a point upstream of the expander.

11. A process for generating power and/or oxygen enriched fluid using an integrated system comprising compressing air in a first compressor, sending air from the first compressor to a combustor and to a first air separation unit, sending nitrogen from the first air separation unit to a point upstream of an expander, sending fuel to the combustor, sending combustion gas from the combustor to the expander and either compressing the nitrogen sent to a point upstream of expander, further compressing the air sent to the first air separation unit from the first compressor or expanding the air sent to the combustor from the first compressor wherein the first air separation unit is one single column and the process comprises feeding the single column of the first separation unit with air, sending liquid nitrogen from an external source to the top of the single column, the external source not being a condenser fed by gaseous nitrogen from the column and removing gaseous nitrogen from the top of the single column and an oxygen enriched fluid from the bottom of the single column.

12. The process as claimed in claim 11 wherein said single column has no bottom reboiler and no top condenser.

13. The process as claimed in claim 11 comprising sending air from a second compressor to the first air separation unit.

14. The process as claimed in claim 13 wherein the external source comprises a second air separation unit comprising at least one column.

15. The process as claimed in claim 14 wherein the second air separation unit comprises a high pressure column and a low pressure column thermally linked with one another and the liquid nitrogen is derived from one of the columns.

16. The process as claimed in claim 15 comprising withdrawing the liquid nitrogen from the high pressure column, pressurizing and sending it to the top of the single column of the first air separation unit.

17. The process as claimed in claim 15 comprising sending liquid from the bottom of the single column to the second air separation unit.

18. The process as claimed in claim 14 comprising sending air to the second air separation unit from one of the first, second or a third compressor.

19. The process as claimed in claim 14 comprising sending gaseous nitrogen from the single column of the first air separation unit to the second air separation unit.

20. The process as claimed in claim 14 comprising means for sending nitrogen from the second air separation unit to a point upstream of the expander.

21. The process as claimed in claim 11 wherein the column of the first air separation unit operates at between 8 and 25 bar.

22. The process as claimed in claim 15 wherein the highest pressure of any column of the second air separation unit is between 5 and 25 bar.

23. The process as claimed in claim 11 wherein the amount of air sent from the first compressor to the first air separation unit and the amount of nitrogen sent upstream of the expander differ by no more than 10%.

24. The process as claimed in claim 23 wherein all the nitrogen originates from the first air separation unit.

25. The process as claimed in claim 23 wherein the nitrogen originates from the first air separation unit and the external source.

26. The process as claimed in claim 25 wherein the external source is a second air separation unit.

27. An air separation apparatus comprising a first compressor, an air separation unit, means for sending air from the first compressor to the air separation unit following cooling and purification, means for removing a nitrogen enriched fluid and an oxygen enriched fluid from the air separation unit wherein the apparatus comprises a further column, means for sending nitrogen-enriched liquid from the air separation unit to the top of the further column, means for sending compressed air to the bottom of the further column and means for removing gaseous nitrogen from the top of the further column and for removing oxygen-enriched fluid from the bottom of the further column and sending it to the air separation apparatus.

28. The apparatus as claimed in claim 27 wherein said further column has no bottom reboiler and/or no top condenser.

29. The apparatus as claimed in claim 27 comprising a second compressor and means for sending air from the second compressor to the further column.

30. The apparatus as claimed in claim 27 comprising means for pressurizing the nitrogen-enriched liquid from a high pressure column, and sending it to the top of the column of the first air separation unit.

31. The apparatus as claimed in claim 27 wherein the air separation unit is a double column comprising a high pressure column and a low pressure column and the nitrogen enriched liquid comes from the high pressure column.

32. The apparatus as claimed in claim 31 comprising means for sending the liquid from the bottom of the further column to the bottom of the high pressure column.

33. The apparatus as claimed in claim 26 wherein the air separation unit is a triple column comprising a high pressure column, an intermediate pressure column and a low pressure column and the nitrogen enriched liquid comes from the high pressure column or the intermediate pressure column.

34. The apparatus as claimed in claim 33 comprising means for sending the liquid from the bottom of the further column to the bottom of the high pressure column or the middle of the intermediate pressure column.

35. An air separation process comprising compressing air in a first compressor, sending air from the first compressor to a first air separation unit, removing a nitrogen enriched fluid and an oxygen enriched fluid from the first air separation unit and feeding the bottom of a further column with air, sending nitrogen-enriched liquid from the first air separation unit to the top of the further column, and removing nitrogen enriched gas from the top of the further column and an oxygen enriched liquid from the bottom of the further column and sending the oxygen enriched liquid to the air separation unit.

36. A process as claimed in claim 35 wherein said further column is a single column having no bottom reboiler and no top condenser.

37. A process as claimed in claim 35 comprising sending air from a second compressor to the further column.

38. A process as claimed in claim 35 comprising pressurizing the nitrogen enriched liquid from the air separation unit, and sending it to the top of the column of the further column.

39. A process as claimed in claim 35 wherein the further column operates at between 8 and 25 bar.

40. A process as claimed in claim 35 wherein the pressure of the higher or highest pressure column of the air separation unit is between 5 and 25 bar.

41. A process as claimed in claim 35 wherein the oxygen enriched liquid at the bottom of the further column contains between 30% and 40% oxygen.

42. The process as claimed in claim 35 wherein the air separation unit is a double column comprising a high pressure column and a low pressure column and the nitrogen enriched liquid comes from the high pressure column.

43. The process as claimed in claim 42 comprising sending the liquid from the bottom of the further column to the bottom of the high pressure column.

44. The process as claimed in claim 35 comprising removing a stream containing at least 80% oxygen from the low pressure column.

45. The process as claimed in claim 35 wherein the air separation unit is a triple column comprising a high pressure column, an intermediate pressure column and a low pressure column and the nitrogen enriched liquid comes from the high pressure column or the intermediate pressure column.

46. The process as claimed in claim 45 comprising sending the liquid from the bottom of the further column to the bottom of the high pressure column or the middle of the intermediate pressure column.

47. The process as claimed in claim 45 comprising removing a stream containing at least 80% oxygen from the low pressure column.

* * * * *

UNITED STATES PATENT AND TRADEMARK OFFICE
Certificate

Patent No. 6,276,171                                                                  Patented: August 21, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jean-Renaud Brugerolle, Paris, France; and Frédérick Judas, Chatenay Malabry, France.

Signed and Sealed this Twenty-sixth Day of August 2003.

TIMOTHY L. MAUST
*Supervisory Patent Examiner*
Art Unit 3744